United States Patent
Soda (10) Patent No.: US 9,785,874 B2
(45) Date of Patent: Oct. 10, 2017

(54) INFORMATION PROCESSING APPARATUS AND POWER-SUPPLY CONTROL METHOD FOR INFORMATION PROCESSING APPARATUS THAT INTERRUPT POWER SUPPLY TO A PRINTING UNIT BASED ON ELAPSING OF A FIRST TIME PERIOD AND THAT INTERRUPT POWER SUPPLY TO A CONTROL UNIT BASED ON ELAPSING OF A SECOND TIME PERIOD

(71) Applicant: CANON KABUSHIKI KAISHA, Tokyo (JP)

(72) Inventor: Yuji Soda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/476,519

(22) Filed: Sep. 3, 2014

(65) Prior Publication Data

US 2015/0062620 A1 Mar. 5, 2015

(30) Foreign Application Priority Data

Sep. 5, 2013 (JP) ................................ 2013-184093

(51) Int. Cl.
*G06K 15/00* (2006.01)
*G06F 1/26* (2006.01)
(Continued)

(52) U.S. Cl.
CPC ........... *G06K 15/4055* (2013.01); *G06F 1/26* (2013.01); *G06F 1/3234* (2013.01);
(Continued)

(58) Field of Classification Search
None
See application file for complete search history.

(56) References Cited

U.S. PATENT DOCUMENTS 5,761,406 A * 6/1998 Kobayashi .......... G06F 11/1441
711/112
6,101,576 A * 8/2000 Kobayashi .............. G06F 12/08
358/1.11
(Continued)

FOREIGN PATENT DOCUMENTS

CN 1498760 A 5/2004
CN 1842124 A 10/2006
(Continued)

*Primary Examiner* — Miya J Williams
(74) *Attorney, Agent, or Firm* — Canon U.S.A., Inc. IP Division (57) ABSTRACT

An information processing apparatus includes a first unit and a second unit supplied with power that can be interrupted individually, a power supply switch configured to be operated by a user, to turn off a power supply of the information processing apparatus, a controller configured to perform shutdown processing of the information processing apparatus thereby interrupting supply of power to the first unit and the second unit, upon turning off of the power supply switch, a first timer unit configured to interrupt the supply of the power to the first unit, after a lapse of a first predetermined time after turning off the power supply switch, and a second timer unit configured to interrupt the supply of power to the second unit, after a lapse of a second predetermined time after turning off the power supply switch. The second predetermined time is longer than the first predetermined time.

12 Claims, 7 Drawing Sheets (51) Int. Cl.
*G06F 1/32* (2006.01)
*H04N 1/00* (2006.01)
*G03G 15/00* (2006.01)
*G03G 15/20* (2006.01)

(52) U.S. Cl.
CPC ..... *H04N 1/00891* (2013.01); *H04N 1/00904* (2013.01); *G03G 15/205* (2013.01); *G03G 15/5004* (2013.01); *G06F 1/3284* (2013.01); *Y02B 60/1267* (2013.01)

(56) References Cited

U.S. PATENT DOCUMENTS

| | | | |
|---|---|---|---|
| 2010/0218016 A1* | 8/2010 | Konno | 713/320 |
| 2011/0052243 A1* | 3/2011 | Suzuki | G03G 15/2039 399/88 |
| 2011/0176160 A1* | 7/2011 | Manabe | 358/1.14 |
| 2012/0194580 A1* | 8/2012 | Sasaki | 347/5 |
| 2013/0151880 A1 | 6/2013 | Hara | |
| 2013/0195498 A1* | 8/2013 | Kusumi | 399/88 |
| 2014/0143562 A1* | 5/2014 | Sunagawa | G06F 1/263 713/300 |
| 2014/0253948 A1* | 9/2014 | Ito | 358/1.14 |
| 2015/0042024 A1* | 2/2015 | Nakashima | F27D 17/004 266/155 |

FOREIGN PATENT DOCUMENTS

| | | | |
|---|---|---|---|
| CN | 1929534 A | | 3/2007 |
| CN | 101056345 A | | 10/2007 |
| CN | 102006385 A | | 4/2011 |
| DE | 202004001913 U1 | | 4/2004 |
| EP | 0712207 A2 | | 5/1996 |
| GB | 2238021 A | | 5/1991 |
| JP | H02-081057 A | | 3/1990 |
| JP | H10-078832 A | | 3/1998 |
| JP | H11-178208 A | | 7/1999 |
| JP | 2004178516 A | * | 6/2004 |
| JP | 2011-022775 A | | 2/2011 |
| JP | 2011053400 A | * | 3/2011 |
| JP | 2011-073176 A | | 4/2011 |
| JP | 2011-076073 A | | 4/2011 |
| JP | 2012-187776 A | | 10/2012 |

* cited by examiner

INFORMATION PROCESSING APPARATUS AND POWER-SUPPLY CONTROL METHOD FOR INFORMATION PROCESSING APPARATUS THAT INTERRUPT POWER SUPPLY TO A PRINTING UNIT BASED ON ELAPSING OF A FIRST TIME PERIOD AND THAT INTERRUPT POWER SUPPLY TO A CONTROL UNIT BASED ON ELAPSING OF A SECOND TIME PERIOD

BACKGROUND OF THE INVENTION

Field of the Invention

The present invention relates to power supply control of an information processing apparatus such as an image forming apparatus.

Description of the Related Art

In recent years, there have been printers having a power supply ON/OFF switch (a secondary switch) only for a secondary-side power supply, for control of a printer power supply and cost reduction. This type of printers do not have a primary-side power supply switch, which is provided to interrupt a primary-side voltage (an alternating current (AC) voltage) supplied to the printer.

In such printers, a central processing unit (CPU) monitors ON/OFF of the secondary switch. Therefore, when the CPU is out of control or freezes, the power supply cannot be turned off even if the power supply switch is turned off. To address this situation, some of the printers have a power supply OFF timer used to forcibly turn off the power supply, when the CPU is in a state such as being out of control. In this type of printers, the power supply OFF timer is set so that the power supply is automatically turned off after a lapse of a predetermined period of time, when the power supply switch on the secondary side is turned off.

For example, Japanese Patent Application Laid-Open No. 10-78832 discusses a shutdown device. When a power supply switch is turned off, this shutdown device causes a workstation to start a shutdown sequence, so as to forcibly interrupt supply of power to the workstation after a fixed period of time.

Usually, when a shutdown sequence is performed on a controller side, it is necessary to shut down a lot of complicated systems such as a memory, in specific order. Therefore, time necessary for the shutdown sequence is estimated, and this necessary time is set in a power supply OFF timer. However, with complication of the systems, the time necessary for the shutdown sequence has increased and therefore, the time set in the power supply OFF timer has increased as well. For this reason, it takes a long time to complete interruption of a voltage supplied to a high voltage unit such as a printer. Thus, in a conventional image forming apparatus, when a CPU is out of control, it takes a long time before supply of power to a high voltage unit is interrupted, after a power supply switch is turned off by a user.

SUMMARY OF THE INVENTION

The present invention is directed to an information processing apparatus and a power-supply control method for information processing apparatus, which are capable of interrupting supply of power at timing optimum for each unit, even when a power supply switch of the apparatus is turned off by a user in a state of abnormal operation of a controller performing shutdown processing.

According to an aspect of the present invention, an information processing apparatus includes, a power supply switch configured to manually turn off a power supply of the information processing apparatus, a plurality of units supplied with power that can be interrupted individually, a control unit configured to perform shutdown processing upon turning off of the power supply switch thereby interrupting supply of power to each of the units, one or more timer circuits corresponding to the one or more units and configured to interrupt the supply of the power to the corresponding unit, after a lapse of an individual predetermined time following the turning off of the power supply switch.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
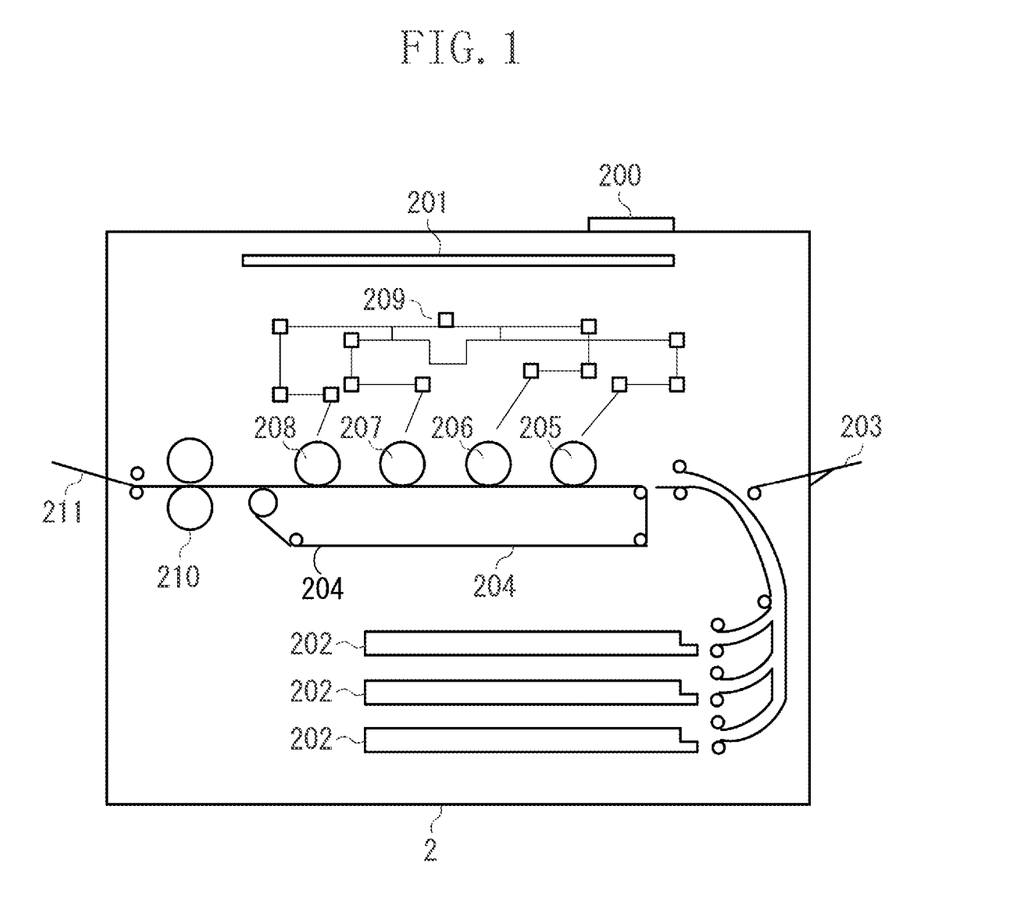
FIG. 1 illustrates an example of an overall configuration of an image forming apparatus according to an exemplary embodiment of the present invention.

FIG. 1 is a diagram illustrating an example of a configuration of an image forming apparatus according to an exemplary embodiment of the present invention.

FIG. 1 illustrates a printer 2 as an image forming apparatus according to the present exemplary embodiment. The printer 2 receives data input from various external apparatuses such as a host computer, and records the data in a recording medium. In the present exemplary embodiment, the printer 2 will be described as a laser beam printer, but may be a printer employing another print method. A configuration of the laser beam printer to which the present exemplary embodiment is applied will be described below.

The printer 2 receives printing information (such as a character code), form-pattern information, or compressed image data input from a host computer connected to outside. The printer 2 stores the input image data, and forms an image on a recording sheet (i.e., recording medium), by creating a corresponding character pattern or form pattern according to these pieces of information, or while decompressing the compressed image data.

Switches for various kinds of operation and light-emitting diode (LED) indicators are arranged on an operation panel 200. A printer control unit (hereinafter referred to as "controller") 201 performs overall control in the printer 2, and analyzes information such as character information supplied from the host computer. The controller 201 mainly converts the character information to a video signal of a corresponding character pattern, or decompresses the compressed image data, and transfers results to a laser scanner unit 209 while doing so.

When printing starts, the printer 2 starts sheet feed operation for feeding a recording sheet from a sheet feed cassette 202 or a manual sheet feed tray 203 into the inside of the printer 2. The recording sheet thus fed is sent to a conveyance unit 204, and conveyed to pass through developing units 205, 206, 207, and 208 sequentially. Simultaneously, the image data for each color decompressed by the controller 201 is subjected to image conversion processing, and then sent to the laser scanner unit 209.

The laser scanner unit 209 is a circuit provided to drive a semiconductor laser, and switches ON/OFF of a laser beam emitted from the semiconductor laser, according to the input image data. Based on the image data received by the laser scanner unit 209, photosensitive drums of the developing units 205, 206, 207, and 208 are laser scanned for the respective colors so that desired color images are formed on the photosensitive drums corresponding to the respective colors. This image formation based on the image data for each color is synchronized with the conveyance of the recording sheet, so that the color images of the respective colors are developed on the recording sheet conveyed by the conveyance unit 204.

Further, a sensor for detecting a toner remaining amount is attached to the developing units 205, 206, 207, and 208. The sensor sends information to a control system of a recording unit, in response to a decrease in toner. A fixing unit 210 thermally fixes the color images thus printed on the recording sheet. The recording sheet is then discharged to a sheet discharge tray 211. Such a configuration of the printer 2 enables independent development of each color and therefore, a print image can be obtained very rapidly.

Figure 2:
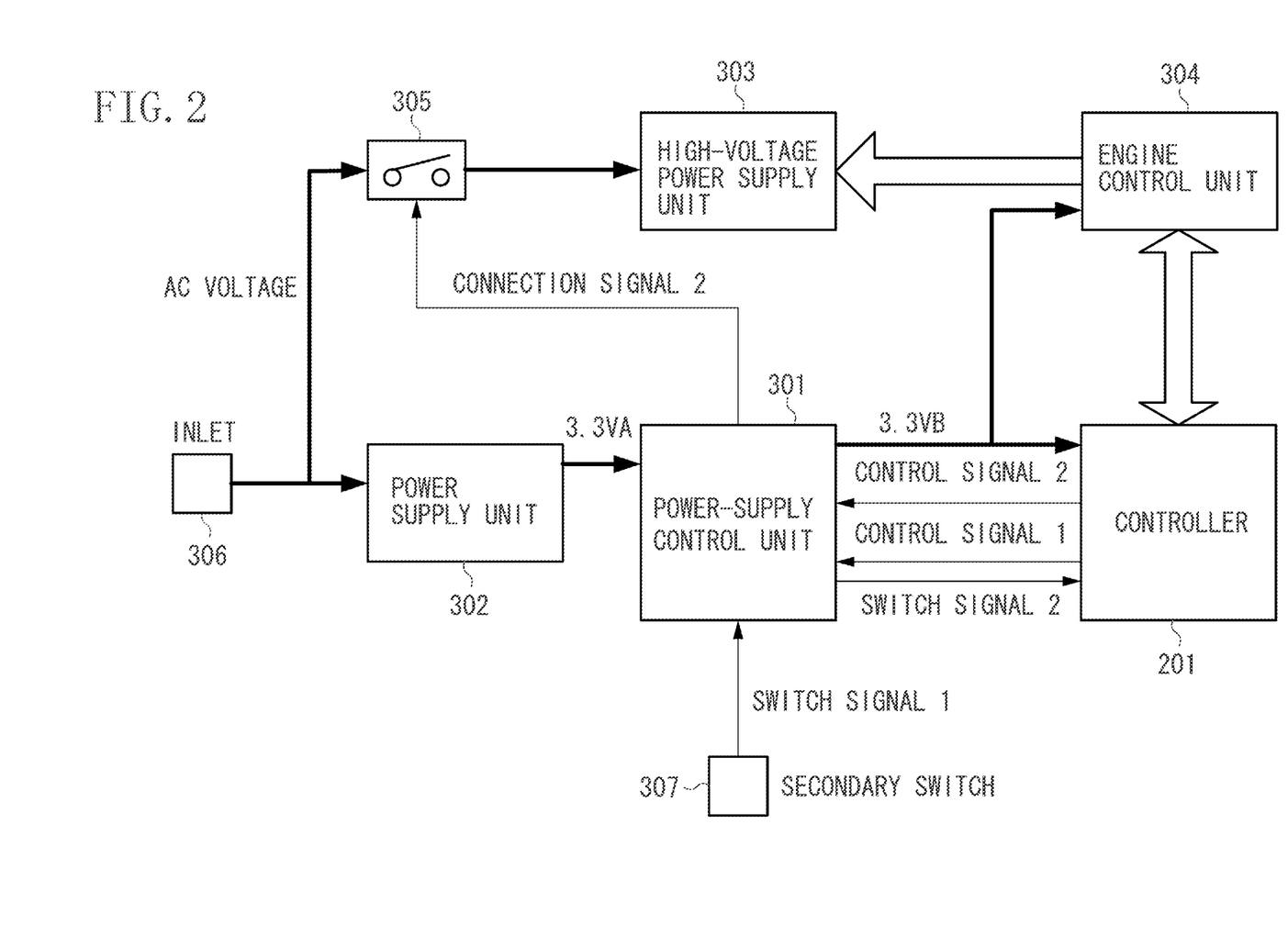
FIG. 2 is a diagram illustrating an example of a configuration for power supply control of the image forming apparatus according to the present exemplary embodiment.

FIG. 2 is a diagram illustrating an example of a configuration for power supply control of the printer 2. A power supply unit 302 receives AC power supplied from the outside through a power supply cord connected to an inlet 306. When the AC power is supplied to the power supply unit 302 through the inlet 306, the power supply unit 302 supplies, for example, 3.3 V, to a power-supply control unit 301 (this voltage will be hereinafter referred to as "3.3 VA").

When being supplied with 3.3 VA, the power-supply control unit 301 shifts to a state for monitoring whether a secondary switch 307 is pressed down. The secondary switch 307 is a power supply switch provided for a user to manually turn off a power supply of the printer 2. When the secondary switch 307 is pressed down (turned on), the power-supply control unit 301 supplies, for example, 3.3 V to the controller 201 (this voltage will be hereinafter referred to as "3.3 VB"). Further, the power-supply control unit 301 supplies 3.3 VB to an engine control unit 304, and controls an AC voltage open/close switch 305. In other words, 3.3 VB is the power supplied to the units including the controller 201 and the engine control unit 304. The AC voltage open/close switch 305 connects (an open state) or interrupts (a closed state) the AC voltage supplied to a high-voltage power supply unit 303.

The engine control unit 304 controls a printer driving system and a high voltage system. The high-voltage power supply unit 303 converts the AC voltage supplied from the AC voltage open/close switch 305, into various voltages to be used in the printer 2, and supplies these voltages to the necessary units. For example, the high-voltage power supply unit 303 supplies power to the units such as an image forming unit (including a high voltage unit and a drive unit) provided to form an image on a recording sheet by an electrophotographic method as described with reference to FIG. 1. For example, the high-voltage power supply unit 303 supplies power of a voltage higher than 3.3 VB, to the units including the controller 201 and the engine control unit 304 described above.

Usually, in operation for turning off a printer power supply, the following operations are performed. First, when the secondary switch 307 is pressed down to turn off the power supply of the printer 2, a switch signal is transmitted to the power-supply control unit 301 as information indicating that the secondary switch 307 has been pressed down. Upon confirming that the secondary switch 307 has been pressed down, the power-supply control unit 301 outputs a switch signal 2 to the controller 201.

Upon receiving the switch signal 2, the controller 201 communicates with the engine control unit 304. The controller 201 then transmits a control signal 2 to the power-supply control unit 301, and starts a shutdown sequence. Upon receiving the control signal 2, the power-supply control unit 301 outputs a connection signal 2 to the AC voltage open/close switch 305, thereby interrupting the AC voltage supplied to the high-voltage power supply unit 303.

After completion of the shutdown sequence, the controller 201 outputs a control signal 1 to the power-supply control unit 301. Upon receiving the control signal 1, the power-supply control unit 301 interrupts supply of 3.3 VB, thereby causing the printer 2 to be in a power supply OFF state. In this way, when the secondary switch 307 is turned off, the controller 201 performs control for interrupting a power circuit of each unit, by performing the shutdown processing. The controller 201 has a CPU, a read-only memory (ROM), and a random-access memory (RAM) that are not illustrated. The controller 201 performs the above-described control, by causing the CPU to execute a program recorded in the ROM.

Next, operation of the present exemplary embodiment will be described with reference to FIGS. 2 and 3.

Figure 3:
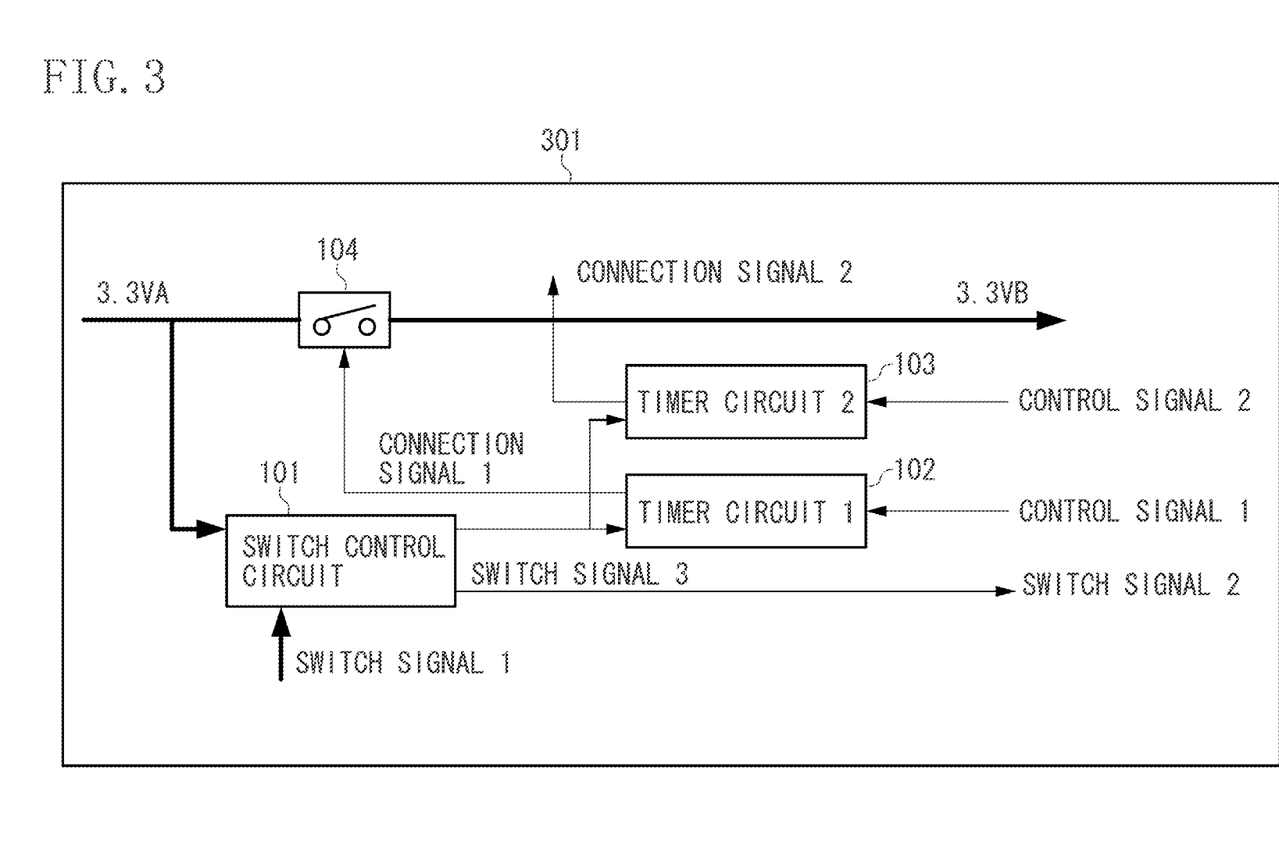
FIG. 3 is a diagram illustrating an example of control in a power-supply control unit when a power supply is turned off.

FIG. 3 is a block diagram illustrating an example of control in the power-supply control unit 301 when the power supply is turned off.

As illustrated in FIG. 2, when the secondary switch 307 is pressed down (turned off) to turn off the power supply of the printer 2, the switch signal 1 is transmitted to the power-supply control unit 301 as information indicating that the secondary switch 307 has been pressed down. In other words, the secondary switch 307 inputs the switch signal 1 to a switch control circuit 101.

Upon receiving the switch signal 1, the switch control circuit 101 sends the switch signal 2 to the controller 201, and outputs a switch signal 3 to a timer circuit 1 (102) and a timer circuit 2 (103).

The timer circuit 1 (102) has a function for outputting a connection signal 1 to a 3.3-V open/close switch 104, after a lapse of a predetermined time following the receipt of the switch signal 3. Based on the connection signal 1, the 3.3-V open/close switch 104 opens/closes (connects or interrupts) 3.3 VB supplied to the controller 201 and the engine control unit 304.

Further, the timer circuit 2 (103) has a function for outputting the connection signal 2 to the AC voltage open/close switch 305, after a lapse of a predetermined time following the receipt of the switch signal 3. Based on the connection signal 2, the AC voltage open/close switch 305 opens or closes (connects or interrupts) the AC voltage supplied to the high-voltage power supply unit 303.

In other words, with the switches 104 and 305, power that can be individually interrupted is supplied to the units including the controller 201 and the engine control unit 304, and to the units including the high voltage unit and the drive unit performing image formation. The switches 104 and 305 are each configured using a field effect transistor (FET) or a relay.

In such a state in which the function of the controller 201 is out of control or freezes (an abnormal state), the controller 201 may not return the control signal 2 and the control signal 1 in response to the output of the switch signal 2 to the controller 201, unlike the above-described operation for turning off the power supply. In this case, in the present exemplary embodiment, the timer circuit 2 outputs the connection signal 2, and the timer circuit 1 outputs the connection signal 1. This allows interruption of the AC voltage supplied to the high-voltage power supply unit 303, and interruption of 3.3 VB supplied to the controller 201 and the engine control unit 304. The timer circuit 2 and the timer circuit 1 will be described in detail below.

Figure 4:
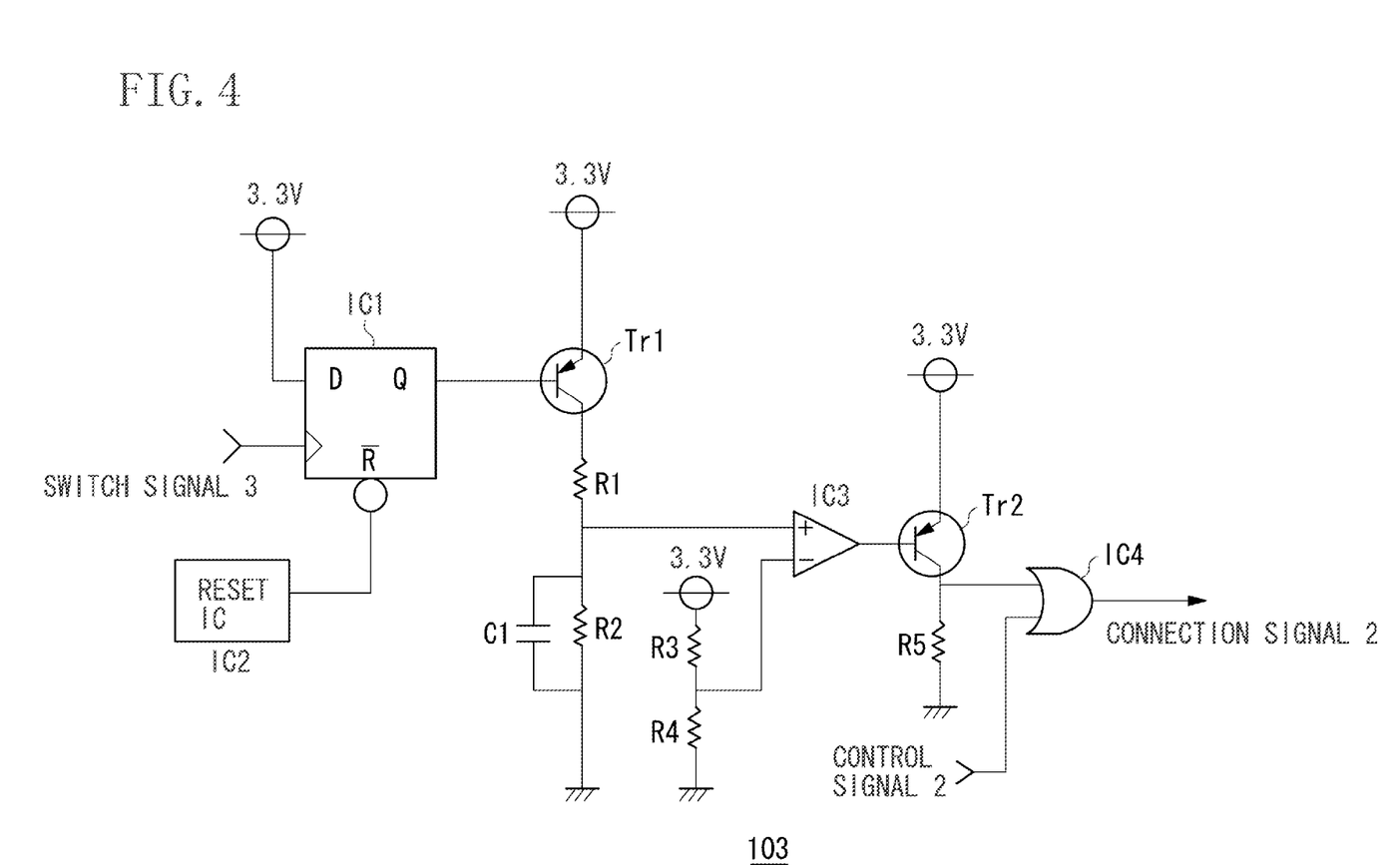
FIG. 4 is a diagram illustrating an example of a circuit configuration of a timer circuit 2 according to a first exemplary embodiment.

FIG. 4 is a block diagram illustrating an example of a circuit configuration of the timer circuit 2 according to a first exemplary embodiment.

A circuit IC2 is a reset integrated circuit (IC) and has a function of resetting a circuit IC1 when 3.3 V is supplied. Upon receiving the switch signal 3 from the switch control circuit 101, the circuit IC1 outputs a "H" level based on a rising edge of the switch signal 3.

Upon receiving the "H" level from the circuit IC1, a transistor Tr1 is turned off. A "+" voltage of a comparator IC3 gradually falls according to a time constant that is determined based on a component constant of each of a capacitor C1 and a resistor R2 (i.e., a capacitance of the capacitor C1 and a resistance value of the resistor R2).

A resistor R3 and a resistor R4 determine a reference voltage to be compared with the "+" voltage in the comparator IC3. When a voltage on a "+" side of the comparator IC3 is lower than a voltage on a "−" side, the comparator IC3 outputs a "L" level. When the comparator IC3 outputs the "L" level, a transistor Tr2 is turned on and outputs a "H" level.

When either the control signal 2 transmitted from the controller 201 or the signal output from the comparator IC3 is at the "H" level, an OR circuit IC4 outputs the connection signal 2 at a "H" level. When the connection signal 2 is at the "H" level, the AC voltage open/close switch 305 is OFF, so that the AC voltage supplied to the high-voltage power supply unit 303 is interrupted. In the timer circuit 2, a circuit having a time constant is formed by the capacitor C1 and the resistor R2. Therefore, the predetermined time of the timer circuit 2, namely, the time from the input of the switch signal 3 into the timer circuit 2, to the output of the connection signal 2, is determined by the component constant of each of the capacitor C1 and the resistor R2. For this reason, a component used as the capacitor C1 and the resistor R2 has a constant that is adopted considering the OFF processing for the power supply to the units including the high voltage unit and the drive unit.

Usually, when the secondary switch 307 is pressed down and the switch signal 2 is input, the controller 201 operating normally sends the control signal 2 to the power-supply control unit 301. The controller 201 also outputs the control signal 1 to the power-supply control unit 301, upon completing the shutdown sequence. When the controller 201 is out of control, the control signal 1 and the control signal 2 are unstable.

However, when the secondary switch 307 is pressed down and the switch signal 3 is input into the timer circuit 2, the "+" voltage of the comparator IC3 starts to fall. When the voltage of the comparator IC3 falls below a voltage serving as the reference voltage, the transistor Tr2 outputs the "H" level to the OR circuit IC4. Therefore, even if the controller 201 becomes out of control thereby destabilizing the control signal 2, the OR circuit IC4 can reliably output the connection signal 2 at the "H" level, and the AC voltage supplied to the high-voltage power supply unit 303 can be interrupted. This makes it possible to interrupt supply of the power from the high-voltage power supply unit 303 to the unit supplied with the power.

Figure 5:
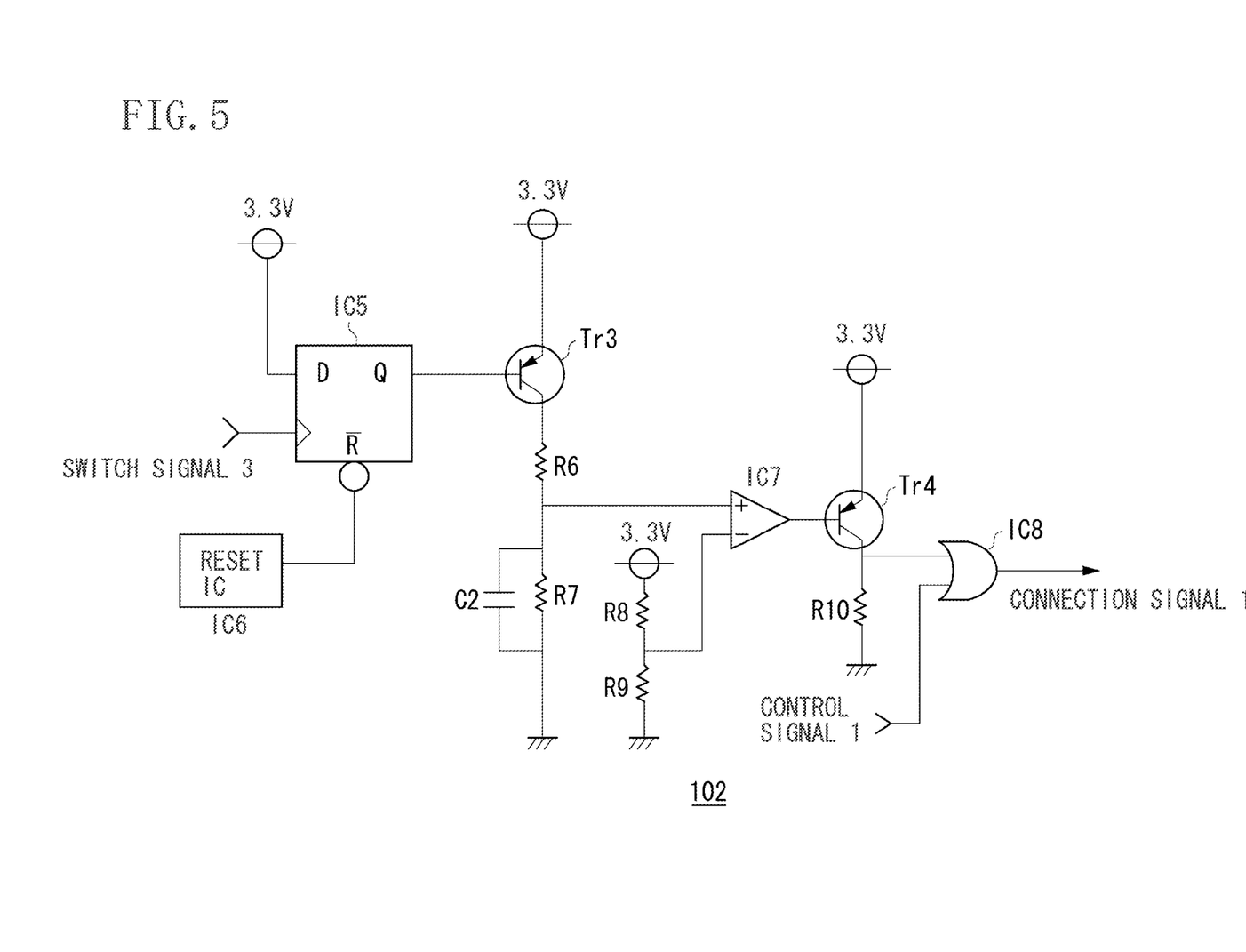
FIG. 5 is a diagram illustrating an example of a circuit configuration of a timer circuit 1 according to the first exemplary embodiment.

FIG. 5 is a block diagram illustrating an example of a circuit configuration of the timer circuit 1 according to the first exemplary embodiment.

Circuits IC5 to IC8, transistors Tr3 and Tr4, resistors R6 to R10, and a capacitor C2 illustrated in FIG. 5 have functions similar to those of the circuits IC1 to IC4, the transistors Tr1 and Tr2, the resistors R1 to R5, and the capacitor C1 illustrated in FIG. 4, respectively. In the timer circuit 1, a circuit having a time constant is formed by the capacitor C2 and the resistor R7. Therefore, the predetermined time of the timer circuit 1 is determined by the component constant of each of the capacitor C2 and the resistor R7 (i.e., a capacitance value of the capacitor C2 and a resistance value of the resistor R7). The predetermined time is the time from the input of the switch signal 3 into the timer circuit 1 to the output of the connect signal 1. Therefore, each component used as the capacitor C2 and the resistor R7 has a value that is adopted considering the OFF processing for the power supply to the units including the controller 201 and the engine control unit 304. This is similar to FIG. 4 and thus will not be described in detail.

As described above, when the secondary switch 307 is pressed down and the switch signal 2 is input, the controller 201 operating normally sends the control signal 2 to the power-supply control unit 301. The controller 201 also outputs the control signal 1 to the power-supply control unit 301, upon completing the shutdown sequence. When the controller 201 is out of control, the control signal 1 and the control signal 2 are unstable. However, when the secondary switch 307 is pressed down and the switch signal 3 is input into the timer circuit 1, a "+" voltage of the comparator IC7 begins to fall. When the voltage of the comparator IC7 falls below a "−" voltage serving as a reference voltage, the transistor Tr4 outputs a "H" level to the OR circuit IC8. Therefore, even if the controller 201 becomes out of control thereby destabilizing the control signal 1, the OR circuit IC8 can reliably output the connection signal 1 at the "H" level, and 3.3 VB supplied to the controller 201 and the engine control unit 304 can be interrupted.

Figure 6:
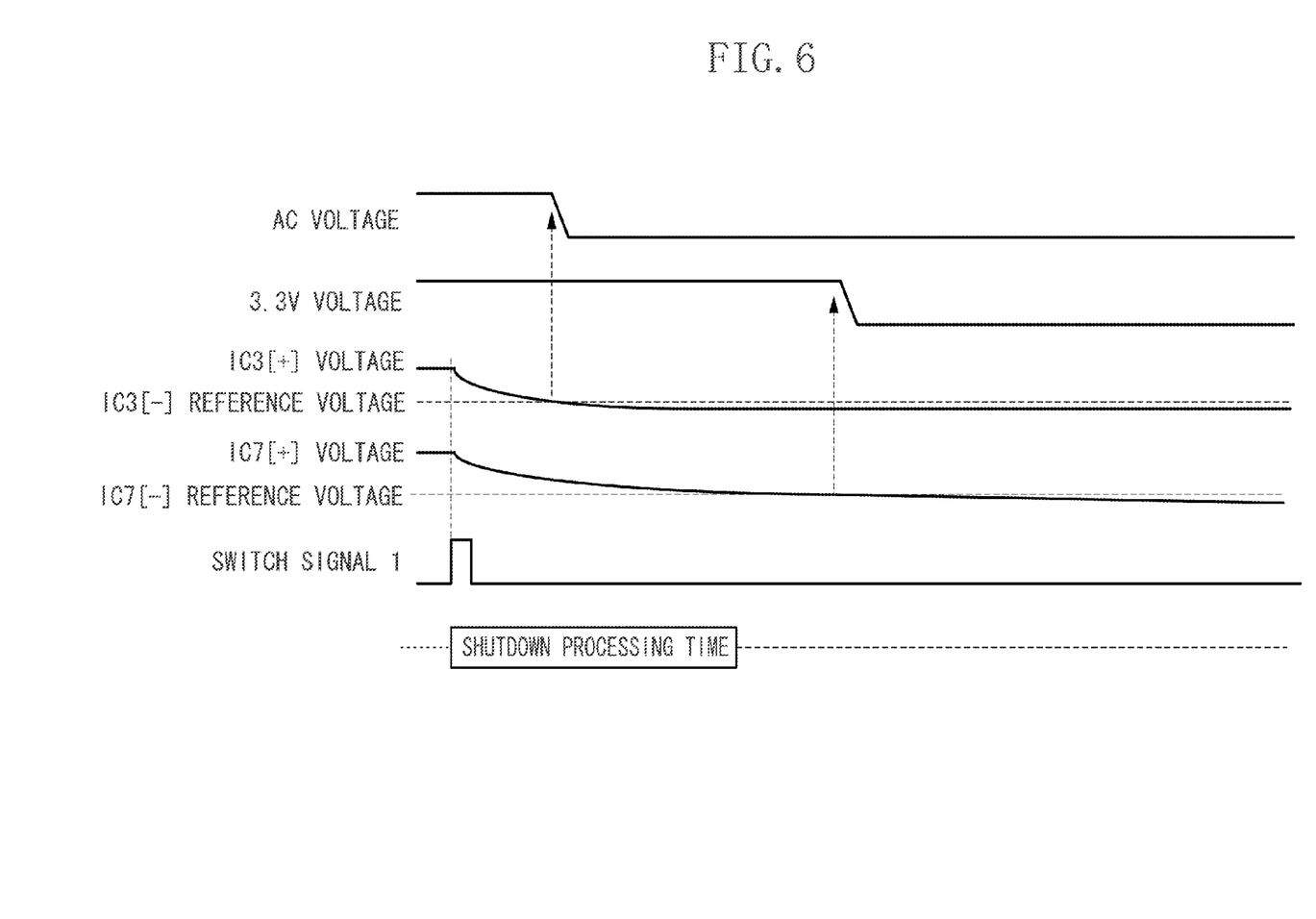
FIG. 6 is a timing chart illustrating an example of timing when power supply is turned off.

FIG. 6 is a timing chart illustrating an example of timing of turning off the power supply in the printer 2.

As described above, when the switch signal 1 is input, the power-supply control unit 301 sends the switch signal 2 to the controller 201 and outputs the switch signal 3 to the timer circuit 1 (102) and the timer circuit (103).

As illustrated in FIG. 6, when the "+" voltage of the comparator IC3 falls below the "−" voltage serving as the reference voltage, the timer circuit 2 (103) outputs the signal (the connection signal 2) for interrupting the AC voltage, so that the AC voltage is interrupted. A capacitor and a resistor used as the capacitor C1 and the resistor R2 of the timer circuit 2 respectively have a capacitance value and a resistance value that are set assuming that the predetermined time of the timer circuit 2 is shorter than the time taken by the shutdown processing.

Similarly, when the "+" voltage of the comparator IC7 falls below the "−" voltage serving as the reference voltage, the timer circuit 1 (102) outputs the signal (the connection signal 1) for interrupting 3.3 V voltage, so that 3.3 V is interrupted. In addition, a capacitor and a resistor used as the capacitor C2 and the resistor R7 of the timer circuit 1 respectively have a capacitance value and a resistance value that are set assuming that the predetermined time of the timer circuit 1 is longer than the time taken by the shutdown processing.

As described above, according to the present exemplary embodiment, one or more power supply OFF timers (here, the timer circuits 1 and 2) are provided to be used when the secondary switch 307 is turned off. Therefore, even when the user turns off the secondary switch 307 in a state in which the controller 201 (CPU) is out of control, the supply of the power to the high voltage unit can be quickly interrupted, while the supply of the power to other blocks can be interrupted after a lapse of a necessary period of time.

In the first exemplary embodiment described above, the time of the timer circuit 1 (102) is determined by forming the circuit having the time constant with only the capacitor C2 and the resistor R7. Therefore, an interrupting time is uniquely determined. However, the shutdown time varies depending on a used application. Therefore, a configuration in which the interrupting time is changeable according to the shutdown time can achieve an effect of enhanced convenience. This configuration will be described below as a second exemplary embodiment.

Figure 7:
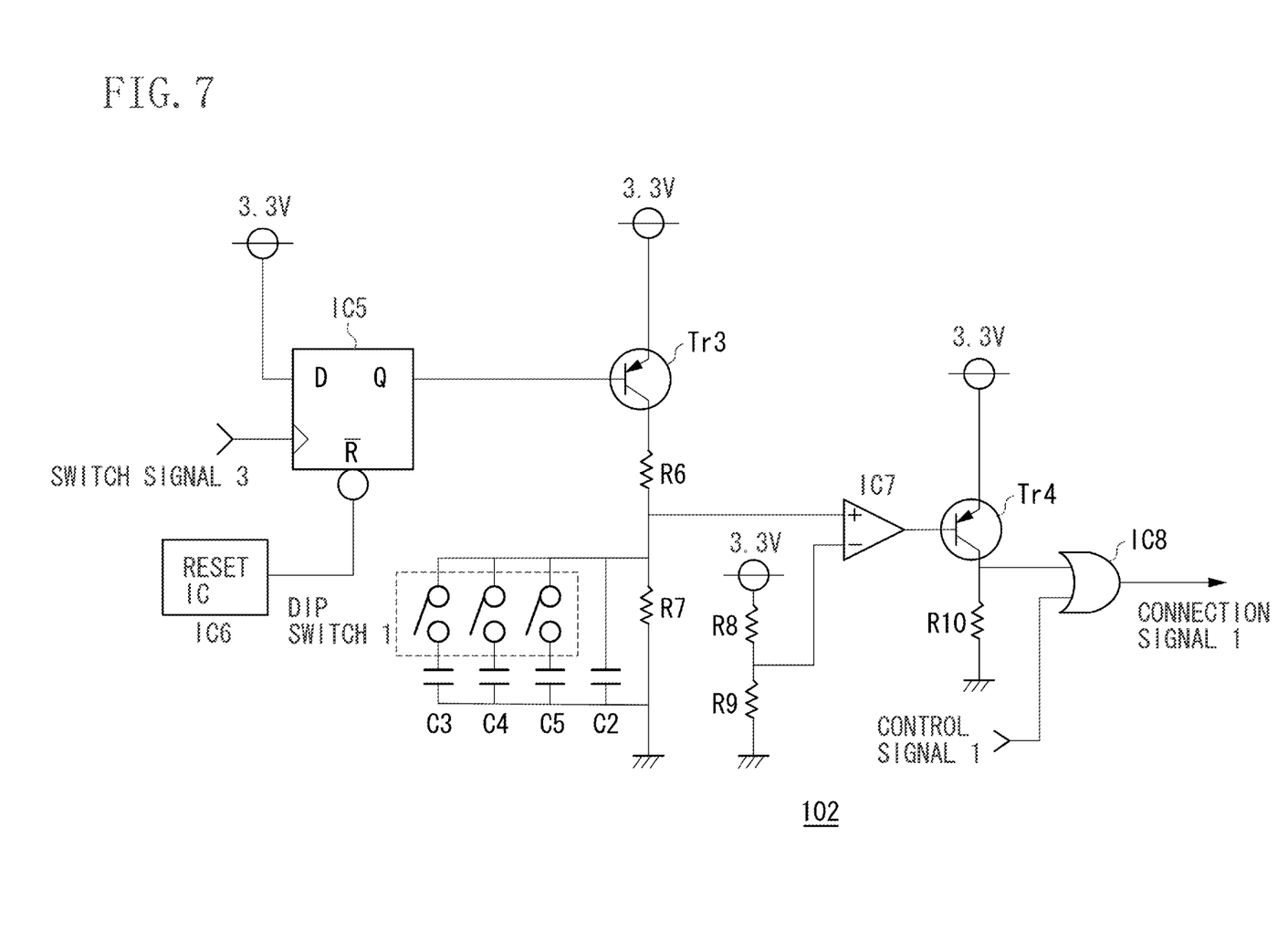
FIG. 7 is a diagram illustrating an example of a circuit configuration of a timer circuit 1 according to a second exemplary embodiment.

FIG. 7 is a block diagram illustrating an example of a circuit configuration of the timer circuit 1 according to the second exemplary embodiment. This corresponds to a circuit configuration in which the interrupting time is changeable. In FIG. 7, similar configurations to those of the timer circuit 1 according to the first exemplary embodiment illustrated in FIG. 5 will not be described, and only a difference will be described.

As illustrated in FIG. 7, a dual in-line package (DIP) switch 1 can turn on and off connection of each of capacitors C3, C4, and C5. In other words, the DIP switch changes the capacitance of the capacitor, thereby controlling the change of time in which the "+" voltage of the comparator IC7 gradually falls, so that an optimum interrupting time can be set.

As described above, according to the second exemplary embodiment, the interrupting time of 3.3 V can be changed according to the shutdown time of an installed application. As a result, an effect of enhanced convenience can be achieved.

In the above-described configuration, the predetermined time of the timer circuit 1 can be changed by changing the capacitance of the capacitor in the time constant circuit of the timer circuit 1. However, the predetermined time of the timer circuit 1 may be changed by changing the resistance value of the resistor in the time constant circuit of the timer circuit 1. Moreover, the predetermined time of the timer circuit 1 may be changed by changing both the capacitance of the capacitor and the resistance value of the resistor in the time constant circuit of the timer circuit 1. In addition, the resistance value may be changed using the one or more resistors and the DIP switch as illustrated in FIG. 7, or may be changed using a variable resistor.

In each of the exemplary embodiments described above, the timer circuit 1 (102) and the timer circuit 2 (103) are provided as the power supply OFF timers used when the secondary switch 307 is turned off. Therefore, the supply of power to the high voltage unit and the supply of power to other blocks are interrupted having time difference. However, three or more power supply OFF timers used when the secondary switch 307 is turned off may be provided to interrupt supply of power to three or more units with time differences based on individual predetermined times of the respective timers.

Further, in each of the exemplary embodiments described above, the circuit that has the time constant determined based on the capacitor C and the resistor R and performs time measuring has been described as an example of each of the timer circuits 1 and 2. However, a timer IC may be used as one or both of the timer circuits 1 and 2.

As described above, the image forming apparatus according to the above-described exemplary embodiments includes the plurality of power supply OFF timers used when the switch on the secondary power source side of the apparatus is turned off. Therefore, even when the secondary switch 307 is pressed down by the user in a state of abnormal operation of the controller 201 performing the shutdown processing, the supply of power can be interrupted at timing optimum for each unit. For example, the supply of power to units using high voltages such as the high voltage unit or the drive unit can be quickly interrupted before the completion of the shutdown processing. Further, supply of power to control units such as the controller 201 and the engine control unit 304 can be interrupted after the completion of the shutdown processing.

The image forming apparatus such as the printer has been described above as an example. However, the present invention is not limited to the image forming apparatus, and can be applied to an information processing apparatus other than the image forming apparatus.

Obviously, configurations and contents of various data are not limited to those described above, and may be any other configurations and contents suitable for intended uses and purposes.

The exemplary embodiments have been described above, but an exemplary embodiment of the present invention may be, for example, a system, an apparatus, a method, a program, or a storage medium. More specifically, the present invention may be applied to a system including a plurality of devices, or may be applied to an apparatus including a single device.

Moreover, the present invention includes all combinations of the exemplary embodiments described above.

The present invention is not limited to the exemplary embodiments described above. Various modifications (including organic combinations of the exemplary embodiments) are possible based on the gist of the present invention, without being excluded from the scope of the present invention. In other words, configurations of combinations of the above-described exemplary embodiments and the modifications are all included in the present invention.

According to the exemplary embodiments of the present invention, even when a power supply switch is turned off by a user in a state of abnormal operation of a control unit performing shutdown operation, supply of power can be interrupted at timing optimum for each unit. As a result, supply of power to a high voltage unit can be quickly interrupted, even when the power supply switch is turned off by the user in a state of a CPU being out of control.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-184093 filed Sep. 5, 2013, which is hereby incorporated by reference herein in its entirety.

What is claimed is:

1. A printing apparatus including a printer, a print controller which controls the printer, and a controller which communicates with the print controller, the printing apparatus comprising:
   a first power supply which supplies power to the printer;
   a second power supply which supplies power to the controller;
   a power switch which receives a user operation for turning off the printing apparatus from a user, wherein, based on receiving the user operation, the controller communicates with the print controller and executes a shutdown processing of the printing apparatus; and
   a power controller which stops power supply to the printer from the first power supply based on the controller having communicated with the print controller, and then stops power supply to the controller from the second power supply based on the controller having executed the shutdown processing, the power controller being different from the print controller;
   wherein the power controller receives an off signal from the power switch, and stops the power supply to the printer from the first power supply when a first predetermined time elapses after the off signal is received, and
   stops the power supply to the controller from the second power supply when a second predetermined time elapses, which is longer than the first predetermined time, after the off signal is received.

2. The printing apparatus according to claim 1, wherein the printer is which forms an image on a sheet.

3. The printing apparatus according to claim 2, wherein the second predetermined time is changeable.

4. The printing apparatus according to claim 1, wherein the power controller has the first timer circuit and the second timer circuit, and at least one of the first timer circuit and the second timer circuit is a circuit having a time constant determined by a capacitor and a resistor.

5. The printing apparatus according to claim 1, wherein the power controller has the first timer circuit and the second timer circuit, and at least one of the first timer circuit and the second timer circuit is a timer IC.

6. The printing apparatus according to claim 1, wherein the power controller stops the power supply to the controller, in response to completion of the shutdown processing.

7. The printing apparatus according to claim 1, wherein the power controller has the first timer circuit and the second timer circuit, the first timer circuit starts a count of the first predetermined time when the power controller receives the off signal from the power switch, and the second timer circuit starts a count of the second predetermined time when the power controller receives the off signal from the power switch.

8. The printing apparatus according to claim 1, wherein the controller communicates with the printer controller when the power controller receives the off signal, the controller then outputs a first control signal to the power controller, and then the power controller stops, based on the first control signal, the power supply to the printer.

9. The printing apparatus according to claim 1, wherein the controller outputs a second control signal to the power controller after the shutdown processing has been completed, and the power controller stops, based on the second control signal, the power supply to the controller.

10. A control method of a printing apparatus including a printer, a print controller which controls the printer, a controller which controls the print controller, a power controller, and a power switch, the control method comprising:
   supplying power from a first power supply to the printer;
   supplying power from a second power supply to the controller;
   receiving, at the power switch, a user operation for turning off the printing apparatus from a user, and when the user operation is received, causing the controller to communicate with the print controller and execute a shutdown processing of the printing apparatus; and
   using the power controller to stop power supply to the printer from the first power supply based on the controller having communicated with the print controller, and then to stop power supply to the controller from the second power supply based on the controller having executed the shutdown processing, the power controller being different from the print controller;
   wherein the power controller receives an off signal from the power switch, and stops the power supply to the printer from the first power supply when a first predetermined time elapses after the off signal is received and
   stops the power supply to the controller from the second power supply when a second predetermined time elapses after the off signal is received, and
   wherein the second predetermined time is longer than the first predetermined time.

11. The control method according to claim 10, wherein the printer forms an image on a sheet.

12. A non-transitory computer-readable recording medium that stores a computer-executable program for a printing apparatus including a printer, a print controller which controls the printer, a controller which controls the print controller, a power controller, and a power switch, the program comprising:
   code for supplying power from a first power supply to the printer;
   code for supplying power from a second power supply to the controller;

code for receiving, at the power switch, a user operation for turning off the printing apparatus from a user, and when the user operation is received, for causing the controller to communicate with the print controller and execute a shutdown processing of the printing apparatus; and code for using the power controller to stop power supply to the printer from the first power supply based on the controller having communicated with the print controller, and then to stop power supply to the controller from the second power supply based on the controller having executed the shutdown processing, the power controller being different from the print controller;

wherein the power controller receives an off signal from the power switch, and stops the power supply to the printer from the first power supply when a first predetermined time elapses after the off signal is received and stops the power supply to the controller from the second power supply when a second predetermined time elapses after the off signal is received, and wherein the second predetermined time is longer than the first predetermined time.

* * * * *